United States Patent
Karnes

3,990,012
Nov. 2, 1976

[54] REMOTE TRANSCEIVER FOR A MULTIPLE SITE LOCATION IN A TWO-WAY CABLE TELEVISION SYSTEM

[75] Inventor: William F. Karnes, Dallas, Tex.

[73] Assignee: TOCOM, Inc., Dallas, Tex.

[22] Filed: Apr. 25, 1975

[21] Appl. No.: 571,869

[52] U.S. Cl. ............................ 325/308; 178/DIG. 13
[51] Int. Cl.² .......................................... H04N 1/44
[58] Field of Search ............... 325/308; 178/DIG. 13

[56] References Cited
UNITED STATES PATENTS

| | | | |
|---|---|---|---|
| 3,643,164 | 2/1972 | Sly et al. ............................ | 325/308 |
| 3,786,424 | 1/1974 | McVoy et al. ................. | 178/DIG. 13 |
| 3,889,050 | 6/1975 | Thompson ........................... | 325/308 |

FOREIGN PATENTS OR APPLICATIONS

| | | | |
|---|---|---|---|
| 992,725 | 5/1965 | United Kingdom .......... | 178/DIG. 13 |

*Primary Examiner*—Benedict V. Safourek
*Assistant Examiner*—Michael A. Masinick
*Attorney, Agent, or Firm*—Giles C. Clegg, Jr.

[57] ABSTRACT

A remote transceiver for a two-way cable television system includes a main receiving, transmitting and logic control unit coupled to a plurality of locally remote control units through a plurality of supplemental tuning and logic sections. A receiver in the main unit acts as the interface between the remote transceiver and a cable network through which interrogation, command and program signals generated from a central or master data station are received. The interrogation and command signals are fed to a main digital logic control section, which controls a transmitter for transmitting data via the cable network to the master station. The television program signals are coupled to a plurality of television receivers each through one of the supplemental tuning and logic sections. Each local remote control unit is coupled to one of the supplemental tuning and logic sections to control each television receiver independently and provide data from each locally remote location to the main digital section. Each locally remoted control unit may be located in a different part of a multiple-site location, for example, in one apartment of an apartment complex. Alarms or other information generating devices at each site may be coupled to the main unit for monitoring by the central data station.

6 Claims, 1 Drawing Figure

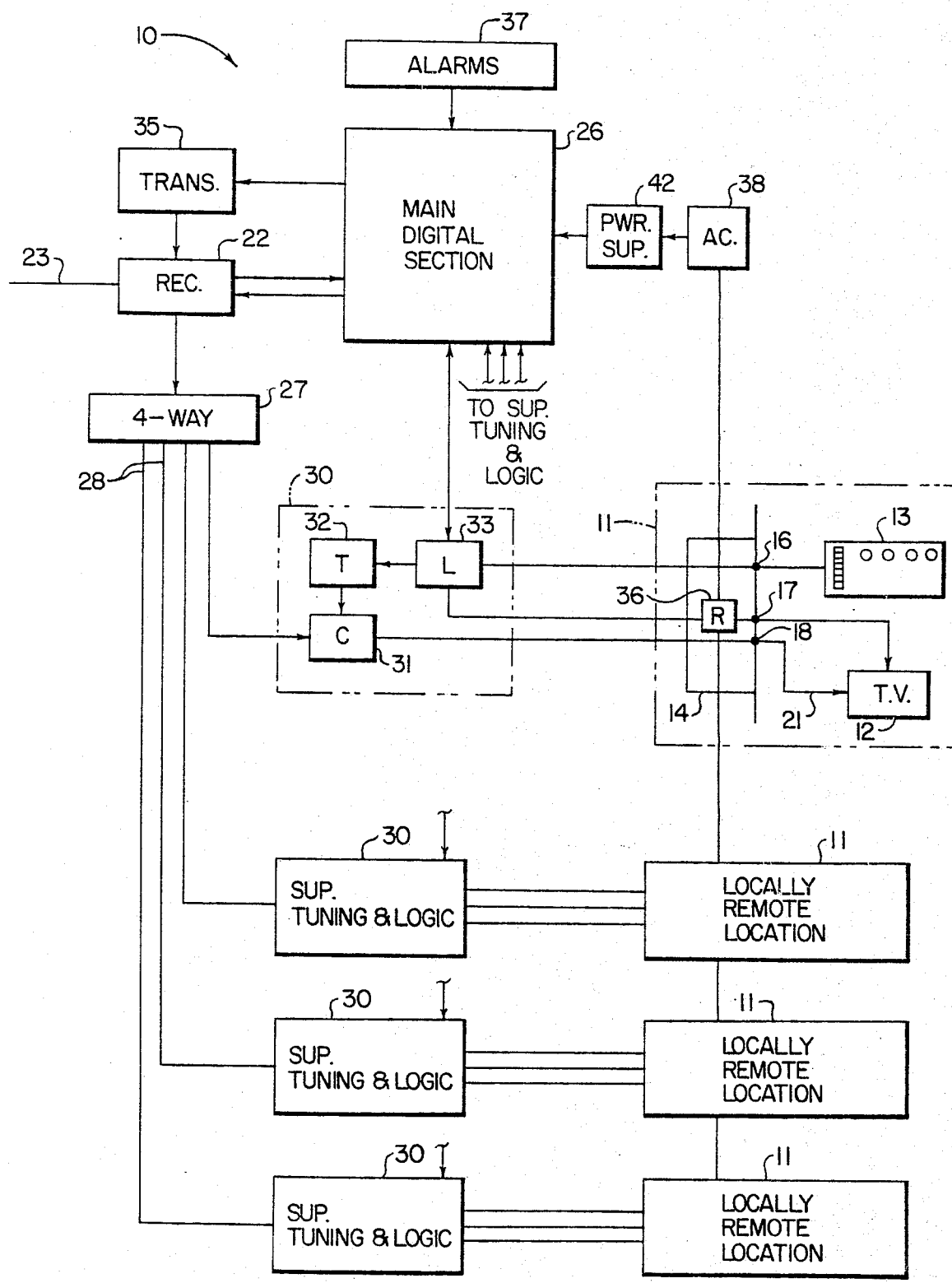

3,990,012

REMOTE TRANSCEIVER FOR A MULTIPLE SITE LOCATION IN A TWO-WAY CABLE TELEVISION SYSTEM

BACKGROUND OF THE INVENTION

1. Field of the Invention.

The present invention relates to remote transceivers for two-way cable television systems and, more particularly, to remote transceivers for multiple-site locations in two-way cable television systems.

2. Technical Considerations and Prior Art.

In two-way cable television communications systems, for example, the systems disclosed in U.S. Pat. No. 3,794,922 to Osborn et al. and 3,803,491 to Osborn, a central data station is coupled for two-way transmission to a plurality of remote transceivers through a coaxial cable network. The cable network consists of a primary trunk cable which is coupled to a plurality of feeder cables to which the remote transceivers are connected. Bidirectional amplifiers and combined amplification and distribution units are provided to maintain the quality of signals transmitted between the central data station and the remote transceivers. Periodically, various information or data is solicited by the central data station from the remote transceivers, for example, the condition of alarms at the remote locations, and other data including viewer response or opinion data and program rating information. Additionally, since the primary purpose of a cable television system is to provide television program signals at the remote transceivers to which commercial television receivers are connected, tuning means are provided at the remote transceivers enabling subscribers to select particular television program channels for viewing.

In the past, a separate remote transceiver was required for each television receiver. Thus, if it was desired to have a plurality of independently controlled television receivers connected to the cable system at a multiple-site location, for example, an apartment house or the like wherein it is desired to control a plurality of television receivers independently of one another, the cost of providing such service for each television was the same as the cost of bringing it into a private home. Similarly, if it was desired to have a plurality of independently controlled television sets in a private home, a separate remote transceiver was required for each television set. In both the foregoing situations, the cost of providing the desired service can be prohibitively high for many subscribers.

It would be an advantage to provide a remote transceiver for a multiple-site location, having several television receivers, independently controlled, without the necessity of providing a remote transceiver unit for each television receiver.

SUMMARY OF THE INVENTION

One object of the present invention is to provide a new and improved remote transceiver for multiple-site location in a two-way cable television system.

A further object of the present invention is to provide a new and improved remote transceiver for a two-way cable television system wherein a plurality of television receivers may be tuned separately with separate controlled channel outputs to each television receiver.

A remote transceiver for a two-way cable television system including a central transmitting and receiving station coupled to a plurality of remote transceivers through a cable network, wherein television program signals, interrogation and command signals are transmitted downstream from the central station to the remote transceivers and upstream data signals are transmitted from the remote transceivers to the central station, in accordance with the principles of the present invention, may include means for receiving the downstream television program signals, directional coupler means having an input coupled to the receiving means and a plurality of outputs, a plurality of RF terminals, each for connecting to a television receiver, a plurality of converter means, each coupling one output of the directional coupler means to one of the RF terminals, tuner means associated with each converter means for selecting a television program channel, operating means for controlling the television receiver associated with each tuner means, and means coupling each operating means to the tuner means for controlling each converter means.

The tuner and converter means, along with the transmitting and receiving portion of the remote transceiver and a main logic section therefor, may be housed in a single control box placed in a convenient location at the multiple-site location. Remoted from the control box is a plurality of wall outlets or the like, which are placed at each of the multiple sites, which may be a unit in an apartment complex or separate parts of a dwelling or other structure. The wall outlets include an RF terminal, an AC outlet, and a connecting means for a hand-held remote control unit which may include television receiver power control means, channel selecting means and viewer response means.

Each hand-held remote control unit is coupled to one of the tuner and converter means to select the television program signal delivered to the multiple-site RF terminal. The hand-held remote control unit is also connected to the logic section in the main unit for information storage in a data readout circuit therein and subsequent transmission back to the central station upon interrogation therefrom. The AC outlet in the wall panel may be controlled by a relay or the like through a logic circuit associated with each tuner and converter means under the control of the hand-held remote control unit.

BRIEF DESCRIPTION OF THE DRAWINGS

A complete understanding of the present invention may be obtained from the following detailed description of a preferred embodiment thereof, when read in conjunction with the accompanying drawing, which shows a remote transceiver for a multiple sitelocation in a two-way cable television system in accordance with the principles of the present invention.

DETAILED DESCRIPTION

Referring to the drawing, there is shown a remote transceiver 10 for a two-way cable television communication system, for example, the system shown and described in the aforementioned patents. As disclosed in the aforementioned Osborn et al. patent, a two-way cable television communications system may include a central data station coupled for two-way transmission to a plurality of remote transceivers through a cable network. The central station is capable of transmitting interrogation signals to identify particular remote units and command codes to the remote units to obtain particular information therefrom, for example, program rating and viewer response information and pay television information and to perform particular functions at the remote locations. The central data station also includes a television program source which provides television program signals for transmission to the remote transceivers. Converter means at the remote transceivers are tuned to select particular channels for viewing on commercial television receivers at the remote transceiver locations.

The remote transceiver 10 shown in the drawing is capable of receiving and distributing television signals to a plurality of multiple-sites or locally remote locations 11. The locally remote locations may represent different units in a multiple-site structure, for example, an apartment house or a large building, including a dwelling house. Each location 11 includes a commercial television receiver 12, which may be controlled separately and independently. A hand-held remote control unit 13 is utilized to control each television receiver 12. The control units 13 may, for example, turn the television sets 12 on and off, select a television program for viewing, provide viewer response information to questions asked of a viewing audience during a particular television program, and provide television rating information to the central station. This type of unit is discussed in more detail in the copending application of Brian E. Belcher, et al., Ser. No. 571,576, filed on even date herewith.

A wall box 14 is preferably provided at each location 11. Each wall box 14 includes a plug-in connection 16 for the control unit 13, an AC outlet 17 into which the power cord of the television receiver 12 may be plugged and an RF terminal 18 which may be coupled to the RF input terminals of the television set 12 through a transmission line or coaxial cable 21.

Each remote transceiver 10 includes a main receiving, transmitting and logic control unit including an RF receiver 22 which is coupled to a feeder cable 23 in the cable television network. The output of the receiver 22 is coupled to a main digital section 26 and to a directional coupling means 27 for making the output of the receiver 22 available at a plurality of RF outputs 28.

Each output 28 of the directional coupler 27 is coupled to an RF terminal 18 of an associated wall box 14 through a supplemental tuning and logic section 30. Within each supplemental tuning and logic section 30, each output 28 is connected to a television converter means 31, which is controlled by a tuning means 32. The output of each converter means 31 is coupled to the RF terminal 18 in the associated wall box 14. The tuner means 32, which is preferably an analog responsive varactor tuner, tunes the converter 31 to select one channel out of the plurality of television program channels available from the associated output 28 of the directional coupler 27. The tuner means 32 may be a digital-to-analog converter, the operation of which is controlled by a digital logic circuit 33, which is coupled to the control unit 13 through the connector 16 in the wall box 14. The digital logic circuit 33 may include a storage register for storing information regarding the particular television channel selected through the unit 13 to control the tuner 32, which in turn controls the converter 31 for selecting a particular program channel to be viewed on the television receiver 12 at each locally remote location 11.

The digital logic circuit 33 may also include a gate circuit which is enabled when a power control switch in the hand-held remote control unit 13 is closed to operate a relay 36 to provide power to the television receiver 12.

A plurality of alarm sensors 37, associated with each remote transceiver 10 may be monitored at the main digital section 26, for example, in a data readout circuit, as taught in the aforementioned patent to Osborn et al., for subsequent transmission through a transmitter 35, coupled through the receiver 22, which acts as the interfacing device between the cable television network represented by the feeder cable 23 and the remote transceiver 10.

When the relay 36 is closed, power is delivered to the AC outlet 17 from a suitable AC source 38, which is also coupled to a power supply circuit 42 for operating the remote transceiver 10. The source 38 may be a 120 v. 60 hz. supply available from a public utility. The receiver 22, the directional coupler 27, the main digital section 26, the power supply circuit 42 and the transmitter 35 all comprising the main logic control unit for each remote transceiver 10. The supplemental tuning and logic units 30 for each locally remote location 11 in the multiple-site structure may be housed in a single control box at a convenient location in the multiple-site structure.

The foregoing arrangement permits each commercial television receiver 12 to be separately controlled by a hand-held remote control unit 13 while minimizing the number of components at the remote transceiver location utilized for such control. With this arrangement each locally remote location 11 becomes a separate remote transceiver having a minimum number of components and thus a minimum amount of maintenance required for it.

Though the invention has been shown and described as being particularly suitable in connection with a particular two-way cable television system, its use in other similar systems will be obvious to those having ordinary skill in the art without departing from the spirit and scope of the invention as defined in the annexed claims.

What is claimed is:

1. An improved remote transceiver for a two-way cable television communications system of the type including receiving means coupling the remote transceiver to a cable network for two-way communications between the remote transceiver and a central transmitting station, a logic controller for decoding downstream signals, including television program, interrogation and command signals and transmitting means coupled to said logic controller for transmitting signals upstream to said central station, through said receiving means wherein the improvement comprises:

a plurality of supplemental controllers, each comprising:
  a logic section coupled to said logic controller;
  a television program signal converter means; and
  tuning means controlled by said logic section for controlling said converter means;

a plurality of locally remote control stations, each comprising:
  an RF terminal, for connection to a signal input of a commercial television receiver, coupled to a converter means in a corresponding supplemental controller;
  selective control means coupled to a logic section in a corresponding supplemental controller;
  means for connecting to the power terminals of the television receiver;

switching means for connecting said power terminal connecting means to a source of electrical power; and means coupling said switching means to a logic section in a corresponding supplemental controller;

directional coupling means having an input coupled to said receiving means and a plurality of outputs, each coupled to a converter in a corresponding supplemental controller, for coupling downstream television program signals to all of said converter means.

2. The improvement of claim 1 wherein said selective control means at each locally remote station controls the converter means associated with its corresponding supplemental controller through said logic section and said tuner means of said supplemental controller independently of said other locally remote stations.

3. The improvement of claim 2 wherein said locally remote stations are located in different parts of a building structure.

4. The improvement of claim 3 wherein said supplemental controllers are located in the same part of said building structure.

5. The improvement of claim 4 wherein said supplemental controllers are located with said logic controller.

6. The improvement of claim 5 wherein said locally remote stations are located in separate apartments in an apartment building.

* * * * *